United States Patent [19]

Derraugh et al.

[11] Patent Number: 5,769,217
[45] Date of Patent: Jun. 23, 1998

US005769217A

[54] COMPACT DISC HOLDER

[75] Inventors: William N. Derraugh, Weston; Peng Cheong Loo, Norwalk, both of Conn.

[73] Assignee: Printlink Publishers, Inc., Monroe, Conn.

[21] Appl. No.: 814,664

[22] Filed: Mar. 11, 1997

[51] Int. Cl.[6] .................................................. B65D 85/57
[52] U.S. Cl. ...................... 206/308.1; 206/232; 206/310; 206/311
[58] Field of Search ................................ 206/232, 308.1, 206/309–311, 472

[56] References Cited

U.S. PATENT DOCUMENTS

| D. 337,005 | 7/1993 | Culverhouse . | |
|---|---|---|---|
| D. 359,861 | 7/1995 | Hesener et al. . | |
| 3,245,691 | 4/1966 | Gorman . | |
| 3,745,055 | 7/1973 | Gorman . | |
| 4,433,780 | 2/1984 | Ellis . | |
| 4,776,463 | 10/1988 | Press | 206/309 |
| 4,932,522 | 6/1990 | Milovich | 206/308.1 |
| 4,951,826 | 8/1990 | Tompkins | 206/309 |
| 5,253,751 | 10/1993 | Wipper . | |
| 5,269,409 | 12/1993 | Brandt et al. . | |
| 5,284,243 | 2/1994 | Gelardi et al. . | |
| 5,381,894 | 1/1995 | Misterka et al. | 206/311 |
| 5,458,235 | 10/1995 | Stone . | |
| 5,462,158 | 10/1995 | Kramer . | |
| 5,485,926 | 1/1996 | Kundert | 206/309 |
| 5,588,528 | 12/1996 | Ozeki | 206/311 |
| 5,645,165 | 7/1997 | Taniyama | 206/232 |

FOREIGN PATENT DOCUMENTS 46073  1/1992  Japan .

OTHER PUBLICATIONS

Rain Forest Nature Search, The Reader's Digest Association, Inc., Copyright 1992.
Pulse of the Planet, The Nature Company, Copyright 1994.

*Primary Examiner*—Jimmy G. Foster
*Attorney, Agent, or Firm*—Ware, Fressola, Van der Sluys & Adolphson LLP

[57] ABSTRACT

A compact disc holder for use with a book, storage container and the like has a compact disc holder tray and transparent plastic compact disc holder cover. The cover is hingedly connected to the tray and protects the compact disc before and after purchase.

30 Claims, 7 Drawing Sheets

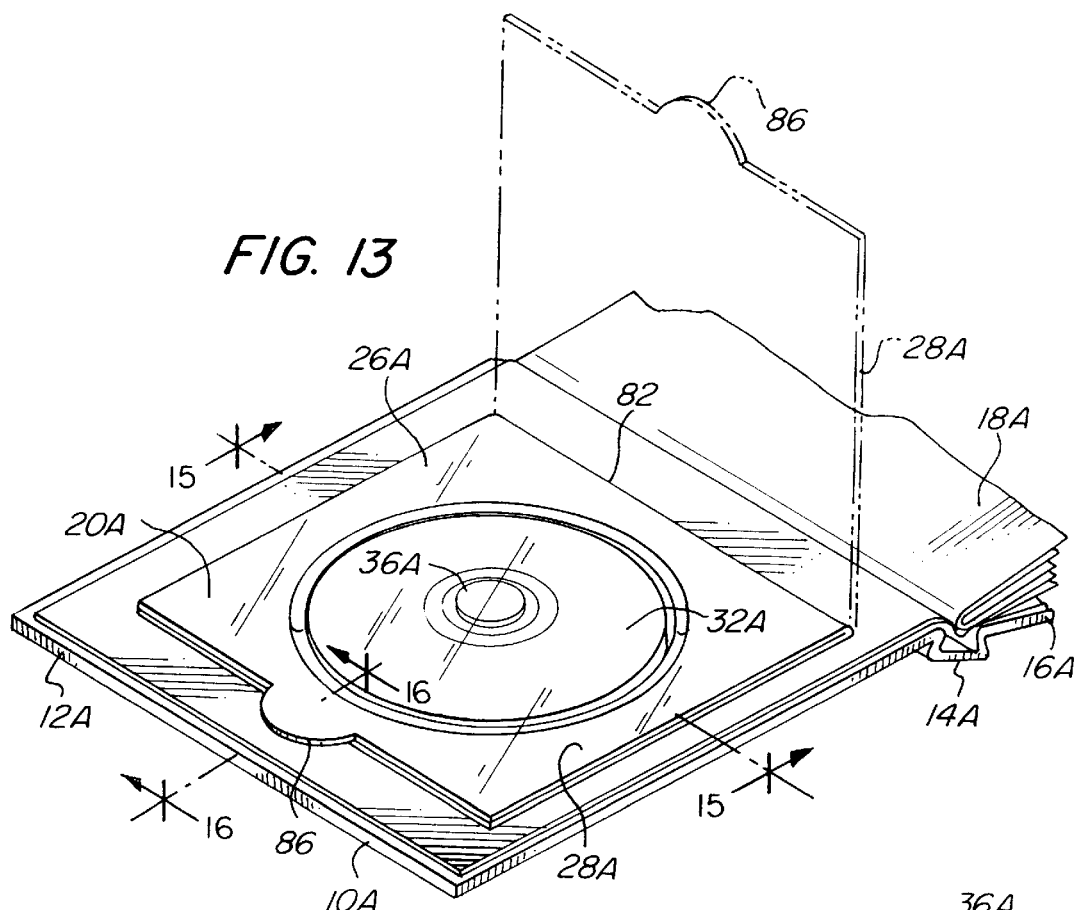
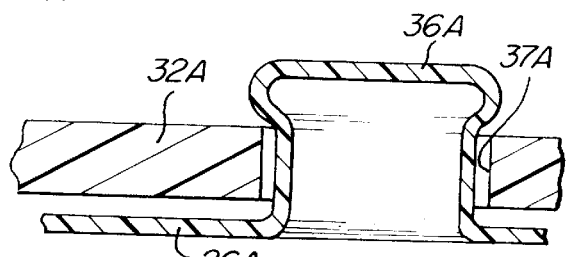
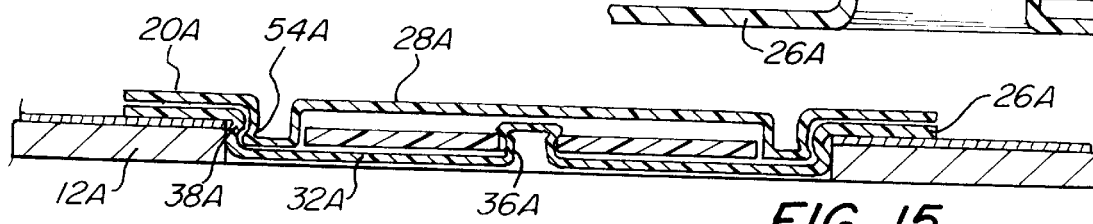
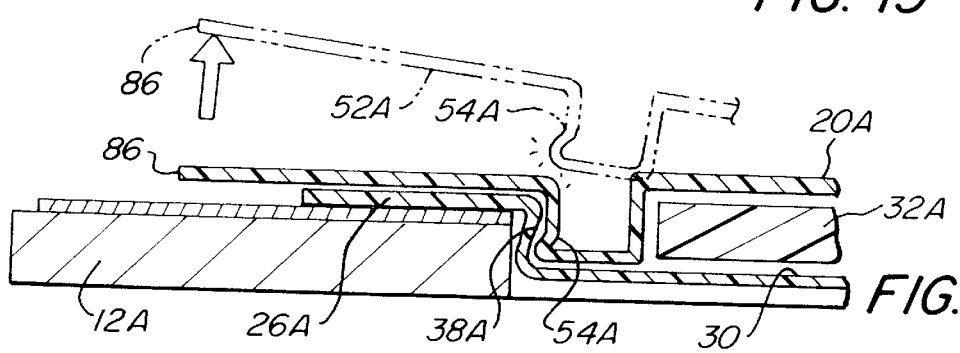

COMPACT DISC HOLDER

BACKGROUND OF THE INVENTION

1. Field of the Invention

The present invention relates to storage containers and the like and, more particularly, to a holder for compact discs.

2. Description of the Prior Art

Conventional compact discs are commonly sold and stored after purchase in a hinged, transparent storage box known as a "jewel box". A typical jewel box includes three molded plastic parts: a transparent base, a transparent cover hinged to the base and an opaque tray removably secured in the base. The tray has a recess with dimensions very similar to those of the compact disc and a centrally located circular array of flexible spring fingers which frictionally engage the edge of the center hole of the compact disc.

Sometimes, compact discs are sold in conjunction with some other item such as a book. In order to keep the book and compact disc together prior to and after purchase, a compact disc holder, generally in the form of a tray having a recess for the compact disc and a circular array of flexible spring fingers for engaging the center hole of the compact disc, is mounted on the cover of the book. Such a mounting permits the compact disc to be readily displayed to customers to allow browsing, encourage impulse buying and provide information about the recordings on the disc to attract and inform customers. Because such compact disc holder does not include a protective jewel box, the compact disc is left exposed on the cover of the book so it is subject to damage and can be easily dislodged from the spring fingers. Also, with the exposed format for the compact disc, the book must be enclosed with a heat shrunk wrapper to prevent separation of the compact disc and book prior to purchase. However, the heat shrunk wrapper makes it impossible for customers to browse through the book prior to purchase which creates a deterrent to purchase.

SUMMARY OF THE INVENTION

The present invention is designed to overcome the above limitations that are attendant upon the use of "prior art" devices, and toward this end, it contemplates the provision of a novel compact disc holder for use in combination with books and storage containers.

It is an object of the present invention to provide a compact disc holder with a cover which holds the compact disc in place prior to and after purchase.

It is also an object to provide such a compact disc holder in which the cover is transparent so the label on the compact disc can be easily viewed by customers.

Yet another object is to provide a compact disc holder which eliminates the need to use heat shrunk wrappers on the accompanying books and storage containers.

A further object is to provide a compact disc holder that is compatible with conventional compact discs and is generally compatible in physical size, form and configuration with such compact discs to be readily adaptable for the use with the same without disadvantage.

It is a general aim of the invention to provide such a compact disc holder which may be readily and economically fabricated and will have long life in operation and significantly greater flexibility in use.

It has now been found that the foregoing and related objects can be readily attained in a compact disc holder in accordance with the present invention which is for use with books, storage containers and the like. The compact disc holder is mounted so that the compact disc therein is visible through an aperture in the pivoted cover of the book, storage container or the like. The compact disc holder comprises a compact disc holder tray having a recess dimensionally sized to accept a conventional compact disc, means engageable with the conventional compact disc to releasably hold the conventional compact disc within the compact disc holder tray, and a compact disc holder cover hingedly connected to the compact disc holder tray so that the compact disc holder cover is pivotable between a closed position and an open position. The compact disc holder cover is dimensionally sized to cover at least a portion of the recess in the compact disc holder tray. The compact disc holder tray and cover are releasably secured to each other in the closed position of the compact disc holder cover.

Preferably, the compact disc holder tray has a lip around at least a portion of the recess and the compact disc holder cover has a downturned flange portion which seats on the lip when the compact disc holder cover is in its closed position. The lip is recessed so that the downturned flange portion of the compact disc holder cover extends into the compact disc holder tray when the compact disc holder cover is in its closed position. The compact disc holder cover can have a generally circular shape and the downturned flange portion is along an edge of the circular shape.

In one embodiment, the compact disc holder has a circular array of flexible spring fingers in the recess engageable with a central aperture of the conventional compact disc to releasably hold the conventional compact disc within the compact disc holder tray. It also has a tray hinge connection for pivotally connecting the compact disc holder cover to the compact disc holder tray and a tray clasp connection for releasably securing the compact disc holder cover to the compact disc holder tray in a closed position. The compact disc holder cover has a cover hinge connection pivotally mounted to the tray hinge connection of the compact disc holder tray so that the compact disc holder cover is pivotable between a closed position covering at least a portion of the recess and an open position so the compact disc can be removed or inserted into the compact disc holder. The compact disc holder cover includes cover clasp connection adapted for releasable mating connection to the tray clasp connection for releasably securing the compact disc holder cover to the compact disc holder tray in the closed position of the compact disc holder cover.

Ideally, the cover hinge connection has flexible arms so that the cover hinge connection and the tray hinge connection achieve a snap fit assembly. One of the compact disc holder cover and the compact disc holder tray has a pair of pins and the other defines a pair of apertures for the pins to define the respective cover hinge connection and tray hinge connection.

Conveniently, the cover clasp connection is an L-shaped clasp and the tray clasp connection is a clasp receiving notched wall. The compact disc holder tray includes an clasp opening through which the L-shaped clasp is inserted when the compact disc holder cover is in its closed position. The cover clasp connection is on an opposite side of the compact disc holder cover from the cover hinge connection.

According to the invention, the compact disc holder cover in its open position defines an angle greater than ninety degrees (90°) with the compact disc holder tray. The cover hinge connection in the open position of the compact disc holder cover abuts the compact disc holder tray to define the greater than ninety degree (90°) angle between the compact disc holder cover and the compact disc holder tray.

Also, the compact disc holder tray has a pair of finger engageable cover release grooves positioned adjacent the tray clasp connection. Each release groove is inclined toward the recess.

In a second embodiment of the compact disc holder, the downturned flange portion on the compact disc holder cover is an embossed flange and the lip on the compact disc holder tray is recessed so that the embossed of said compact disc holder cover releasably engages with the compact disc holder tray to releasable hold the compact disc holder cover and the compact disc holder tray together when the compact disc holder cover is in its closed position.

The invention will be fully understood when reference is made to the following detailed description taken in conjunction with the accompanying drawings.

BRIEF DESCRIPTION OF THE DRAWINGS

FIG. 13 is a perspective view of the book of FIG. 10 showing the cover thereof in an open position;

FIG. 14 is an enlarged fragmentary cross-sectional view of the nipple portion of the second embodiment of the compact disc holder;

FIG. 15 is a cross-sectional view taken along the 15—15 line of FIG. 13; and

FIG. 16 is an enlarged cross-sectional view taken along the 16—16 line of FIG. 13 showing the compact disc holder cover in its closed position in solid line and in a partially open position in phantom line.

DETAILED DESCRIPTION OF THE INVENTION

Figure 1:
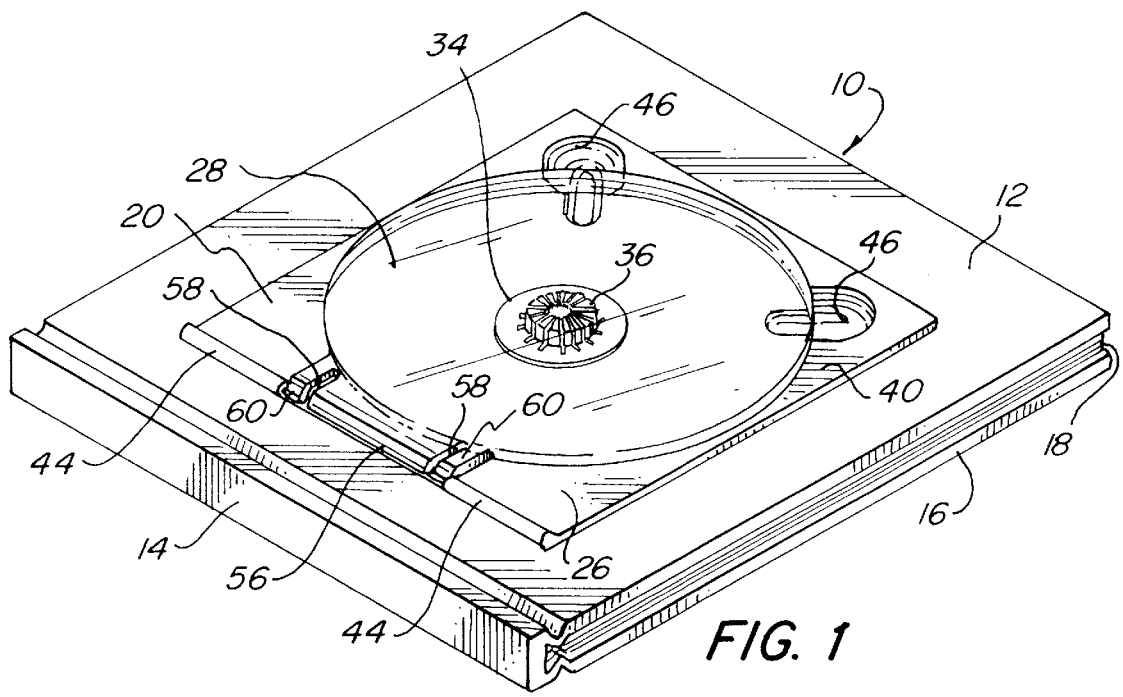
FIG. 1 is a perspective view of a book which utilizes the compact disc holder of the present invention.
Figure 2:
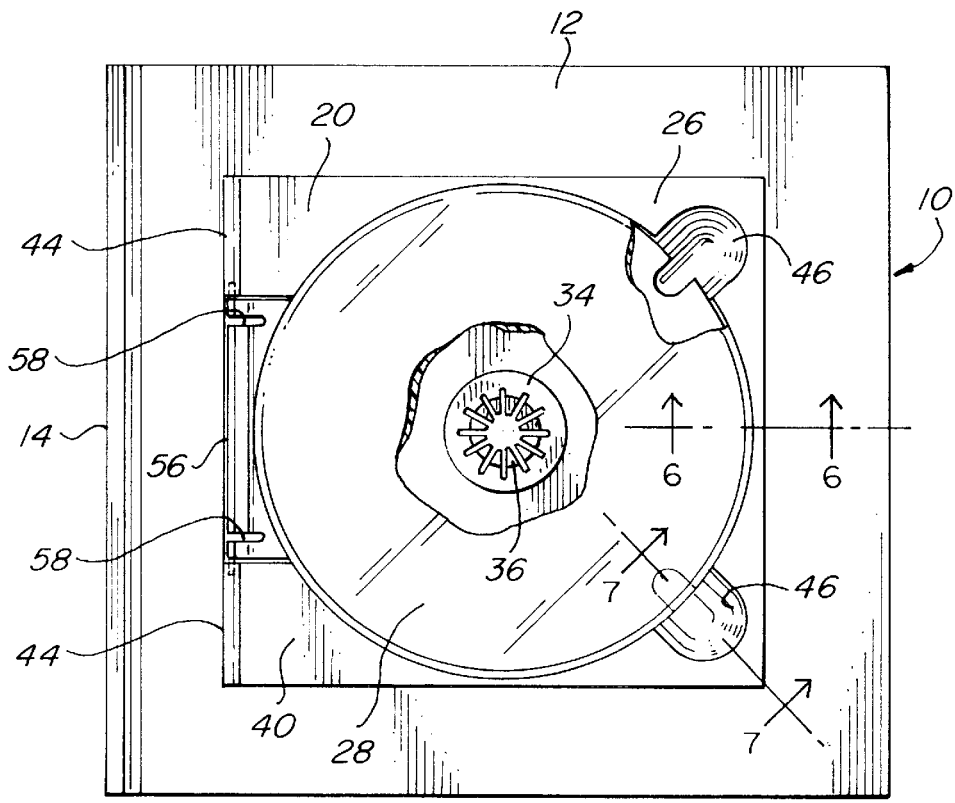
FIG. 2 is a top plan view of the book of FIG. 1 showing the compact disc holder of the present invention with parts of its cover broken away to illustrate internal structure.
Figure 3:
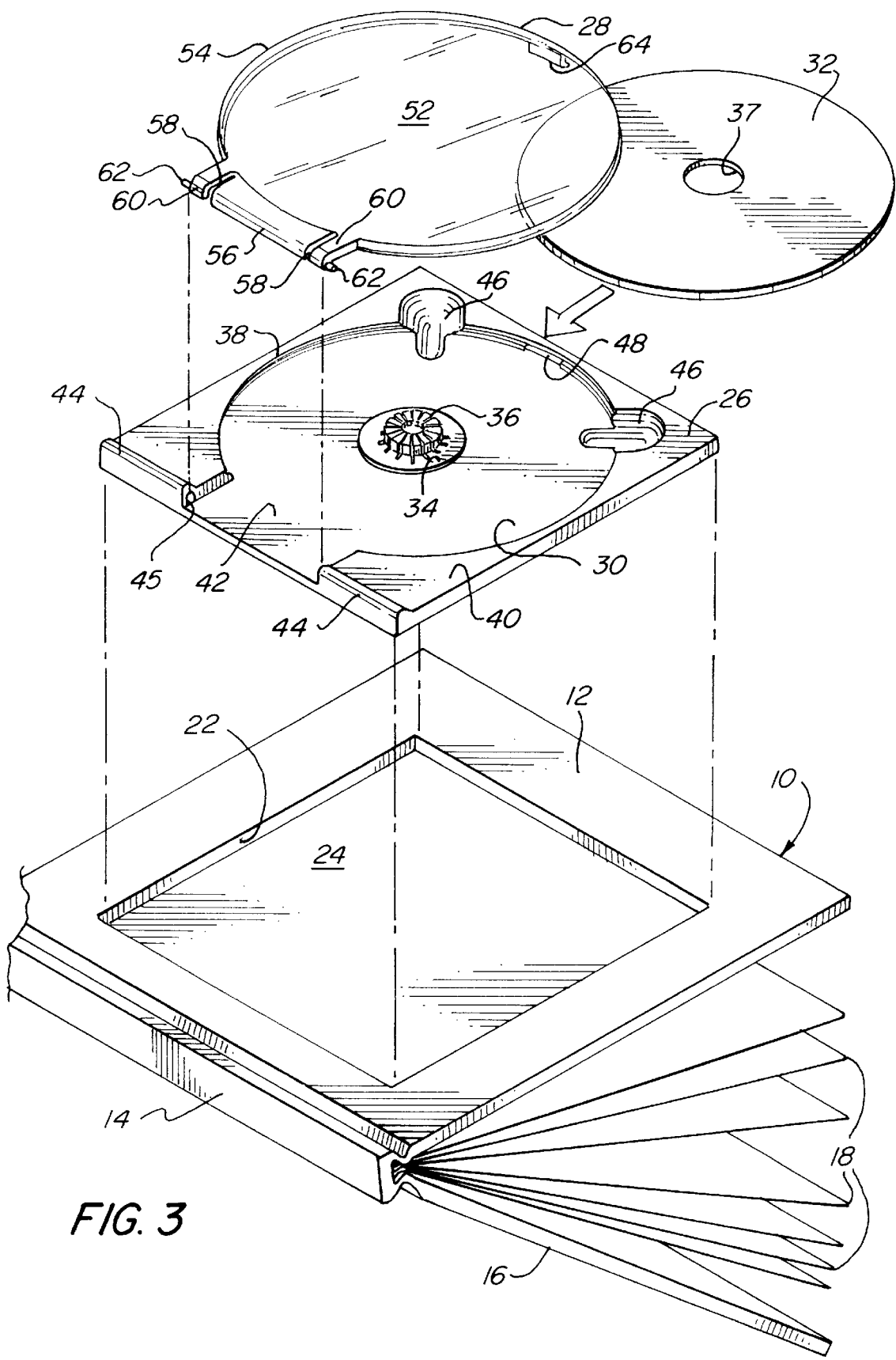
FIG. 3 is an exploded perspective view of the book of FIG. 1 showing the compact disc holder of the present invention with a compact disc being inserted therein.

Turning first to FIGS. 1–3 of the drawings, therein illustrated is a book generally designated by the numeral 10 and comprised of a rectangular pivoted front cover 12, an elongated spline 14 and a rectangular pivoted rear cover 16 with a plurality of pages 18 therebetween. The front cover 12 is relatively thick and has a compact disc holder 20 made in accordance with the present invention mounted in an aperture 22 therein. The front cover 12 has a paper backing page 24 (FIG. 3) forming a seat for the compact disc holder 20 which can be secured thereto by adhesive.

As best seen in FIG. 3, the compact disc holder 20 has a generally rectangular compact disc holder tray 26 with a transparent generally circular cover 28 hingedly connected thereto. The compact disc holder tray 26 is molded from a thin opaque plastic resin and has a recess 30 slightly larger in diameter than a conventional compact disc 32 and slightly deeper than the thickness of the conventional compact disc 32. The conventional compact disc 32 can be for music or be computer related. The cover 28 is preferably molded from a transparent plastic resin. The compact disc holder tray 26 could be dimensionally sized to fit two or more compact discs 32 in a sandwiched relationship.

Figure 6:
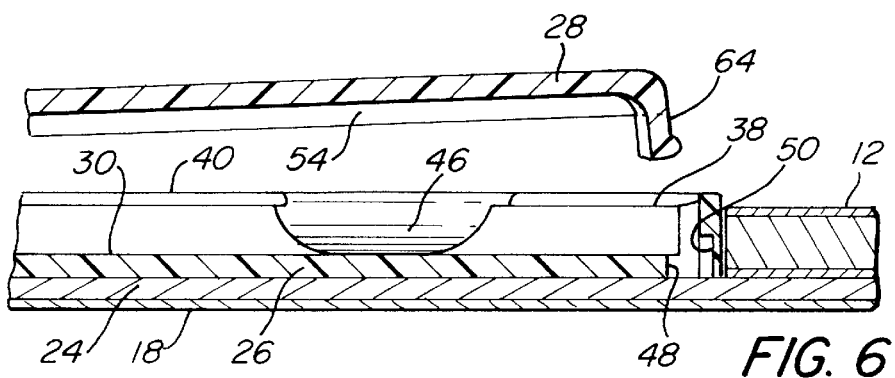
FIG. 6 is an enlarged cross-sectional view taken along the 6—6 line of FIG. 2 showing the clasp portion of the compact disc holder with the cover in a partially open position.
Figure 7:
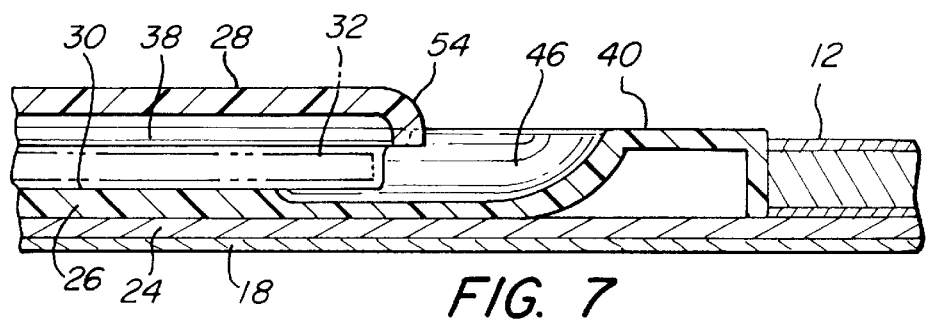
FIG. 7 is an enlarged cross-sectional view taken along the 7—7 line of FIG. 2 showing the finger insertion portion of the compact disc holder with the cover in a closed position and showing a conventional compact disc in phantom line.

As best seen in FIG. 3, centrally located in the recess 30 is a platform 34 with a circular array of flexible spring fingers 36 for releasably securing the conventional compact disc 32 in the recess 30 by means of a mating relationship with its central aperture 37. On the circular periphery of the recess 30 is a lip 38 which transitions into a raised flat land area 40. The recess 30 also has a rectangular extension 42 on one side thereof. Extending from the raised flat land area 40 adjacent the rectangular extension 42 are generally semi-circular contusions 44 forming opposed openings 45 (only one shown in FIG. 3) to hingedly connect the cover 28 to the compact disc holder tray 26. On the other side of the recess 30 are a pair of downwardly sloping finger engageable cover release grooves 46 which start in the raised flat land area 40 and proceed downwardly into the recess 30 as best seen in FIG. 7. As seen in FIG. 6, a clasp opening 48 is defined in the lip 38 and the recess 30 between the downwardly sloping finger engageable cover release grooves 46 whereby a clasp receiving notched end wall 50 is formed.

Figure 4:
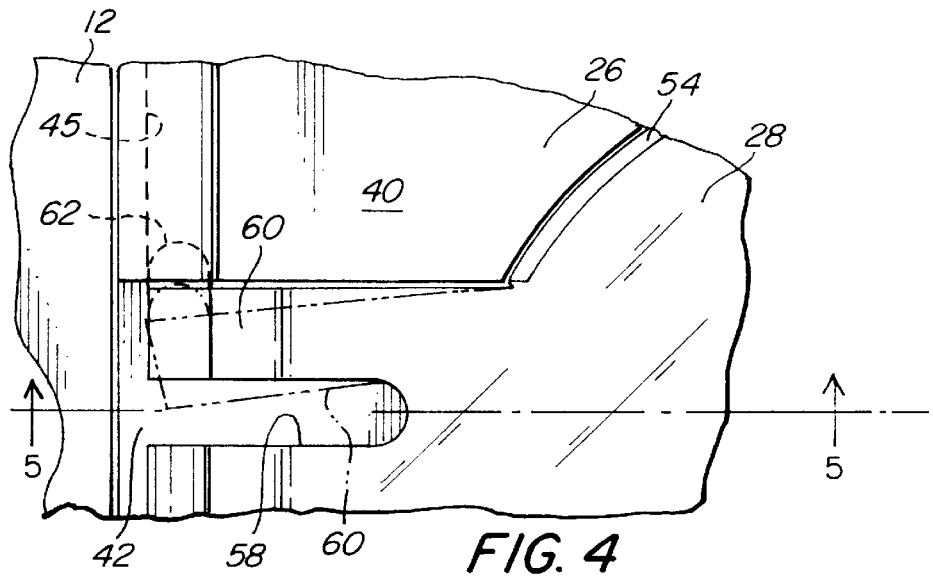
FIG. 4 is an enlarged fragmentary top plan view of the hinge portion of the compact disc holder with the disengaged position shown in phantom line.
Figure 5:
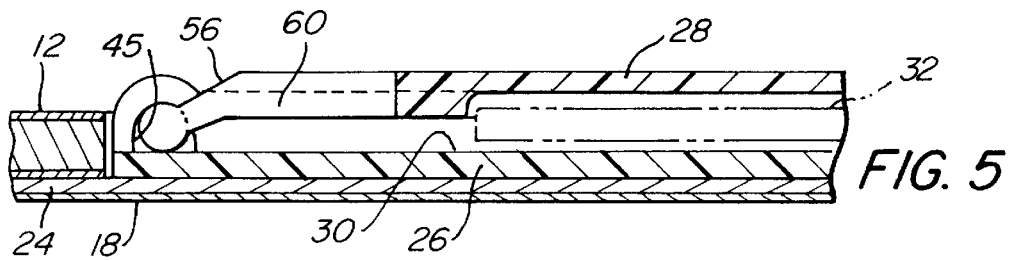
FIG. 5 is a cross-sectional view taken along the 5—5 line of FIG. 4 and showing a conventional compact disc in phantom line.

The cover 28 has a circular planar main surface 52 (FIG. 3) with a downturned flange edge 54 for seating engagement on the lip 38 of the compact disc holder tray 26 when the cover 28 is in its closed position. On one side of the circular planar main surface 52 is an angled hinge extension portion 56 with a pair of spaced apart grooves 58 which create a pair of arms 60 which each have a hinge pin 62 on the end thereof. The pins 62 extend in opposite directions. The grooves 58 create a natural resiliency or flexural characteristics in the arms 60 as illustrated in FIG. 4. to permit the hinge pins 62 to "snap" or "lock" in the openings 45 to form a pivotally hinged connection between the compact disc holder tray 26 and the cover 28 and to hold them in firm assembly.

On the other side of the circular planar main surface 52 is an L-shaped clasp 64 dimensionally sized to fit into the clasp opening 48 and engage the clasp receiving notched end wall 50 to hold the cover 28 in its closed position. It will be appreciated by those skilled in the art that the mating L-shaped clasp 64 on the clasp opening 48 can take other forms, such as a magnetic closure, mating hook and loop material, adhesive tape or a pivoted hook arrangement, to hold the cover 28 in its closed position.

In use, the book 10 is purchased with the conventional compact disc 32 mounted in the compact disc holder 20. The conventional compact disc 32 fits in the recess 30 seated on the raised platform 34 and is held in place though cooperation with the circular array of flexible spring fingers 36. The conventional compact disc 32 is protected from being dislodged from the circular array of flexible spring fingers 36 by the cover 28 when it is in its closed position shown in FIGS. 1–2, 5 and 7. In the closed position, the cover 28 is held against pivotal movement by means of the interaction of the L-shaped clasp 64 of the cover 28 and the clasp opening 48 in the clasp receiving notched end wall 50 of the compact disc holder tray 26. To remove the conventional compact disc 32, the user slides his or her fingers into the downwardly sloping finger engageable cover release grooves 46 with enough force to dislodge the L-shaped clasp 64 from the clasp receiving notched end wall 50 as shown in FIG. 6. The cover 28 can then be pivoted to its fully open position in which the cover 28 is located at greater than a ninety degree (90°) angle to the compact disc holder tray 26. Further movement of the user's fingers along the downwardly sloping finger engageable cover release grooves 46 forces the conventional compact disc 32 to overcome the holding force of the circular array of flexible spring fingers 36 whereby the conventional compact disc 32 is released therefrom so it can be removed from the compact disc holder 20.

The compact disc holder tray 26 and cover 28 are preferably molded from a plastic resin material such as polyethylene, polypropylene, high impact polystyrene, impact modified acrylic or the like. It should be to those skilled in the art that these components may be manufactured from other suitable materials which exhibit the desired resiliency to permit the locking and pivotal engagement of the cover 28 and the compact disc holder tray 26.

Figure 8:
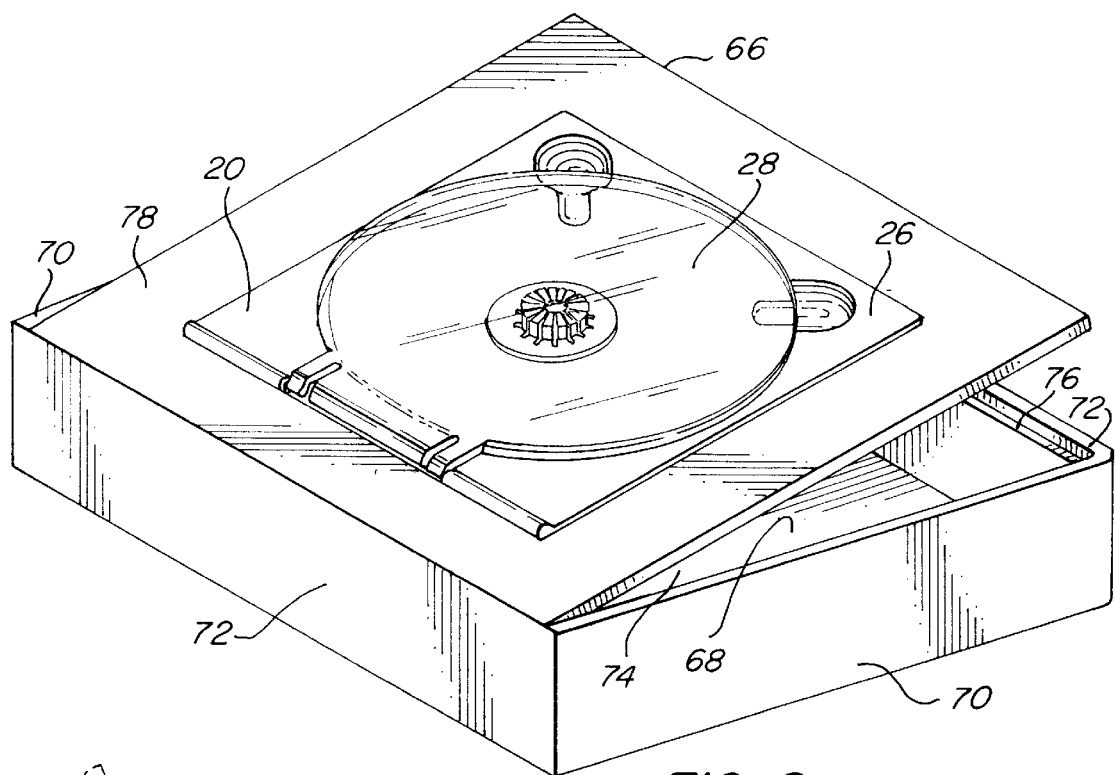
FIG. 8 is a perspective view of a storage container which utilizes the compact disc holder of the present invention and showing the cover of the storage container in an open position.
Figure 9:
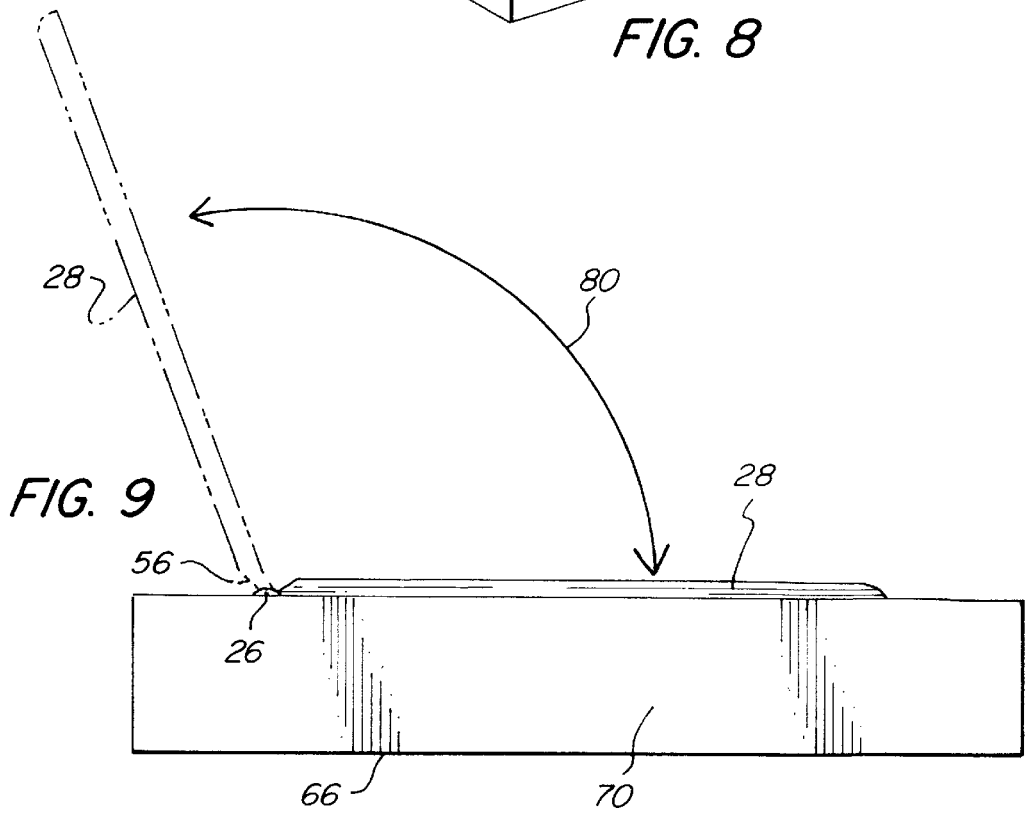
FIG. 9 is a side elevational view of the storage container of FIG. 8 showing the cover of the compact disc holder in a solid line closed position and a phantom line fully open position.
Figure 10:
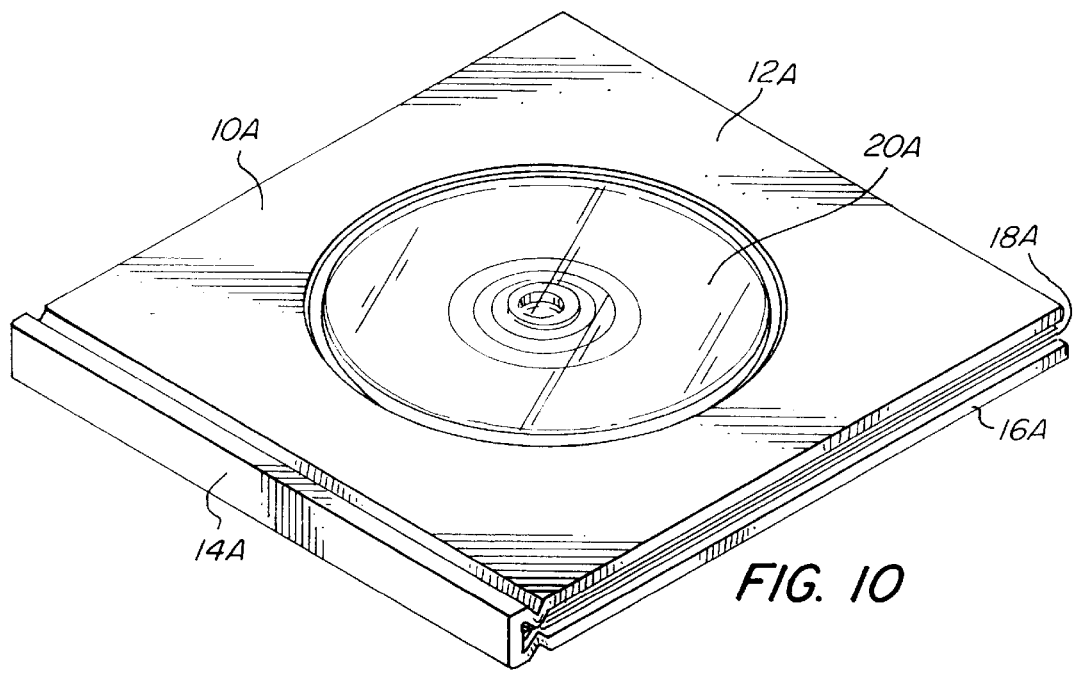
FIG. 10 is a perspective view of a book which utilizes the second embodiment of the compact disc holder of the present invention.
Figure 11:
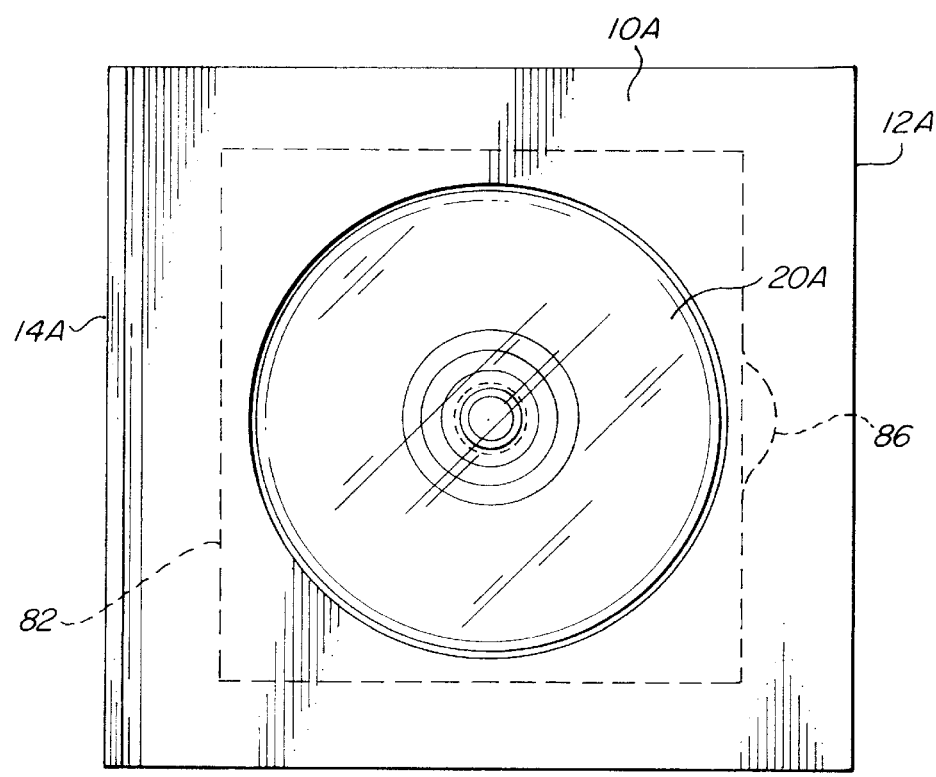
FIG. 11 is a top plan view of the book of FIG. 10 showing the second embodiment of the compact disc holder of the present invention.

Turning now to FIGS. 8 and 9, another embodiment of storage container is illustrated therein in the form of a storage box 66 with which the compact disc holder 20 of the present invention can be used. The compact disc holder 20 illustrated in FIGS. 8 and 9 is identical in structure and operation with the compact disc holder 20 illustrated in FIGS. 1–7. The storage box 66 has a generally rectangular bottom wall 68 with a pair of side walls 70 and a pair of end walls 72. A lip 76 is defined on one of the end walls 72 to provide a stop for a cover 78 which is hingedly connected to the other end wall 72. As indicated by arrow 80 in FIG. 9, the user can move the cover 28 between its solid line closed position and its phantom line fully open position. The extent of the opening of the cover 28 is governed by the angled hinge extension portion 56 as it abuts the compact disc holder tray 26 in its fully open position. The angle between the compact disc holder tray 26 and cover 28 in the fully open position is preferably greater than ninety degrees (90°) whereby the cover 28 is held in its fully open position.

Figure 12:
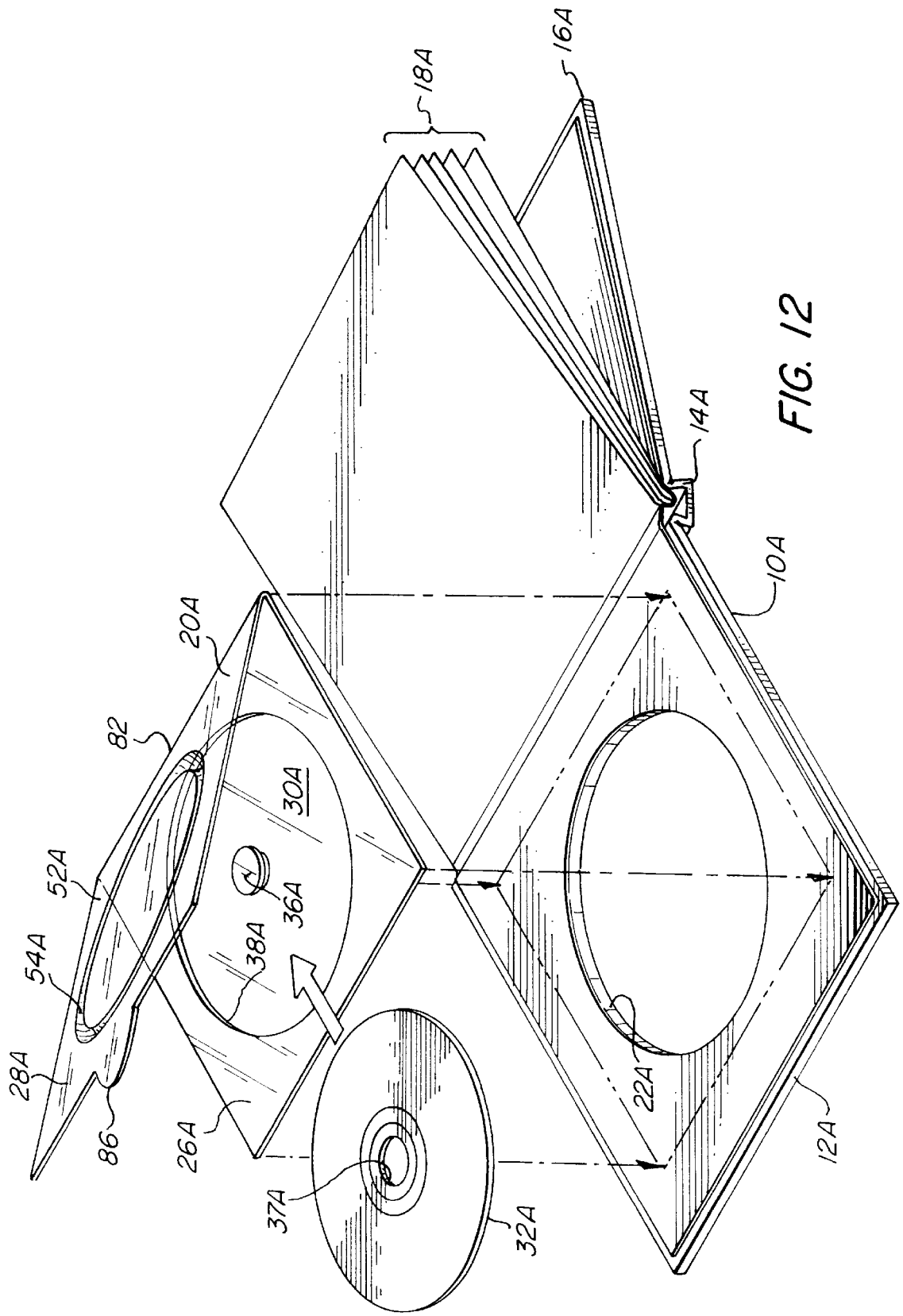
FIG. 12 is an exploded perspective view of the book of FIG. 10 showing the second embodiment of the compact disc holder of the present invention with a compact disc being inserted therein.

Referring to FIGS. 10–16 of the drawings, therein illustrated is another embodiment of the compact disc holder 20A of the present invention. The book 10A is comprised of a rectangular pivoted front cover 12A, an elongated spline 14A and a rectangular pivoted rear cover 16A with a plurality of pages 18A therebetween. The front cover 12A is relatively thick and has the compact disc holder 20A mounted in an aperture 22A (FIG. 12) therein. Unlike the compact disc holder 20 in the book 10 in the first embodiment, the compact disc holder 20A is secured to the front cover 12A by adhesive on the inside of the front cover 12A as best seen in FIGS. 12 and 13.

As shown in FIGS. 12 and 13, the compact disc holder 20A is in the form of a thin molded transparent plastic sheet having a generally rectangular compact disc holder tray 26A with a generally rectangular cover 28A connected thereto by means of a "living hinge" formed by a fold 82 in the transparent plastic sheet. The compact disc holder tray 26A has a recess 30A slightly larger in diameter than a conventional compact disc 32A and slightly deeper than the thickness of the conventional compact disc 32A. The compact disc holder tray 26A could be dimensionally sized to fit two or more compact discs 32A in a sandwiched relationship.

As best seen in FIGS. 12–14, centrally located in the recess 30A is a nipple 36A having an enlarged end 84 for releasably securing the conventional compact disc 32A in the recess 30A by means of a mating relationship with its central aperture 37A. On the circular periphery of the recess 30A is a lip 38A.

The cover 28A has a circular planar main surface 52A with a downturned embossed flange 54A for mating engagement with the lip 38A of the compact disc holder tray 26A when the cover 28A is in its closed position. On one side of the circular planar main surface 52A opposite the fold 82 is a tab 86 which extends beyond the compact disc holder tray 26A when the cover 28A is in its closed position (FIG. 13). As illustrated in FIG. 16, the natural resiliency or flexural characteristics of the downturned embossed flange 54A of the cover 28A and the lip 38A of the compact disc holder tray 26A permit the downturned embossed flange 54A to "snap" or "lock" with the lip 38A to hold them in the releasable closed position.

In use, the book 10A is purchased with the conventional compact disc 32A mounted in the compact disc holder 20A. The conventional compact disc 32A fits in the recess 30A and is held in place though cooperation with the nipple 36A. The conventional compact disc 32A is protected from being dislodged from the nipple 36A by the cover 28A when it is in its closed position. In the closed position, the cover 28A is held against pivotal movement by means of the interaction of the downturned embossed flange 54A as it "snaps" or "locks" with the lip 38A. To remove the conventional compact disc 32A, the user slides his or her fingers under the tab 86 with enough force to dislodge the downturned embossed flange 54A from the lip 38A. The cover 28A can then be pivoted to its open position shown in phantom line in FIG. 13. The user can then urge the conventional compact disc 32A to overcome the holding force of the nipple 36A whereby the conventional compact disc 32A is released therefrom so it can be removed from the compact disc holder 20A.

Thus, artisans skilled in the art will appreciate that the compact disc holders of the present invention as described herein can be employed advantageously to receive a compact disc in an efficient and convenient manner. It will, therefore, be seen from the above that the invention described admirably achieves the objects of the invention. However, it will be appreciated that departures can be made by those skilled in the art without departing from the spirit and scope of the invention, which is limited only by the following claims.

What is claimed is:

1. In a construction having a pivoted cover with an aperture therein, the improvement comprising:

a compact disc holder mounted in the construction so that a compact disc therein is visible through the aperture, the compact disc holder comprising a compact disc holder tray having a recess dimensionally sized to accept a conventional compact disc, means engageable with the conventional compact disc to releasably hold the conventional compact disc within said compact disc holder tray, a compact disc holder cover hingedly connected to said compact disc holder tray so that said compact disc holder cover is pivotable between a closed position and an open position, said compact disc holder cover being dimensionally sized to cover at least a portion of said recess, and means adapted for releasably securing said compact disc holder cover to said compact disc holder tray in the closed position of said compact disc holder cover.

2. A construction in accordance with claim 1, wherein said compact disc holder tray has a lip around at least a portion of the recess and said compact disc holder cover has a downturned flange portion which seats on said lip when said compact disc holder cover is in its closed position.

3. A construction in accordance with claim 2, wherein said lip is recessed so that said downturned flange portion of said compact disc holder cover extends into said compact disc holder tray when said compact disc holder cover is in its closed position.

4. A construction in accordance with claim 2, wherein said compact disc holder cover has a generally circular shape and said downturned flange portion is along an edge of the circular shape.

5. A construction in accordance with claim 4, wherein said lip is recessed so that said downturned flange portion of said compact disc holder cover extends into said compact disc holder tray when said compact disc holder cover is in its closed position.

6. A construction in accordance with claim 2, wherein said lip is recessed so that said downturned flange portion of said compact disc holder cover releasably engages said compact disc holder tray to releasable hold said compact disc holder cover and said compact disc holder tray together when said compact disc holder cover is in its closed position.

7. A construction in accordance with claim 6, wherein said downturned flange portion is an embossed flange.

8. A construction in accordance with claim 1, wherein said compact disc holder cover has a generally circular shape and an edge of the circular shape is downturned.

9. A construction in accordance with claim 1, wherein
(a) said compact disc holder tray has a tray hinge connection for pivotally connecting said compact disc holder cover to said compact disc holder tray and a tray clasp connection for releasably securing said compact disc holder cover to said compact disc holder tray in a closed position; and
(b) said compact disc holder cover has a cover hinge connection pivotally mounted to said tray hinge connection of said compact disc holder tray so that said compact disc holder cover is pivotable between a closed position and an open position and a cover clasp connection adapted for releasable mating connection to said tray clasp connection for releasably securing said compact disc holder cover to said compact disc holder tray in the closed position of said compact disc holder cover.

10. A construction in accordance with claim 9, wherein said cover hinge connection has flexible arms so that said cover hinge connection and said tray hinge connection achieve a snap fit assembly.

11. A construction in accordance with claim 10, wherein one of said compact disc holder cover and said compact disc holder tray has a pair of pins and the other defines a pair of apertures for said pins to define the respective cover hinge connection and tray hinge connection.

12. A construction in accordance with claim 9, wherein one of said compact disc holder cover and said compact disc holder tray has a pair of pins and the other defines a pair of apertures for said pins to define the respective cover hinge connection and tray hinge connection.

13. A construction in accordance with claim 9, wherein said cover clasp connection is an L-shaped clasp and said tray clasp connection is a clasp receiving notched wall.

14. A construction in accordance with claim 13, wherein said compact disc holder tray includes an clasp opening through which said L-shaped clasp is inserted when said compact disc holder cover is in its closed position.

15. A construction in accordance with claim 9, wherein said cover clasp connection is on an opposite side of said compact disc holder cover from said cover hinge connection.

16. A construction in accordance with claim 9, wherein said compact disc holder cover in its open position defines an angle greater than ninety degrees (90°) with said compact disc holder tray.

17. A construction in accordance with claim 16, wherein said cover hinge connection in the open position of the compact disc holder cover abuts said compact disc holder tray to define the greater than ninety degree (90°) angle between said compact disc holder cover and said compact disc holder tray.

18. A construction in accordance with claim 1, wherein said compact disc holder tray has at least one finger engageable cover release groove.

19. A construction in accordance with claim 18, wherein each said release groove is inclined toward said recess.

20. A construction in accordance with claim 18, wherein said at least one finger engageable cover release groove is a pair of finger engageable cover release grooves positioned adjacent said recess.

21. A construction in accordance with claim 1, wherein said means engageable with the conventional compact disc to releasably hold the conventional compact disc within said compact disc holder tray is a plurality of spring fingers dimensionally sized for engagement with a central aperture in the conventional compact disc.

22. A construction in accordance with claim 21, wherein said plurality of spring fingers are located in the recess of said compact disc holder tray.

23. A construction in accordance with claim 1, wherein said means engageable with the conventional compact disc to releasably hold the conventional compact disc within said compact disc holder tray is a nipple dimensionally sized for releasable engagement with a central aperture in the conventional compact disc.

24. A construction in accordance with claim 23, wherein said nipple is located in the recess of said compact disc holder tray.

25. A construction in accordance with claim 1, wherein said compact disc holder is mounted in said aperture of the pivoted cover.

26. A construction in accordance with claim 1, wherein said compact disc holder cover is accessible from an inside surface of the pivoted cover.

27. A construction in accordance with claim 1, wherein said compact disc holder cover is accessible from an outside surface of the pivoted cover.

28. A construction in accordance with claim 1, wherein said compact disc holder is mounted on an inside surface of the pivoted cover.

29. A construction in accordance with claim 1, wherein the construction is a book.

30. A construction in accordance with claim 1, wherein the construction is a storage box.

* * * * *